United States Patent [19]

Kosak et al.

[11] 4,158,796

[45] Jun. 19, 1979

[54] SPEED SETTING AND CONTROL SYSTEM FOR UNIVERSAL MOTORS

[75] Inventors: Wolfgang Kosak, Moglingen; Peter Werner, Stuttgart, both of Fed. Rep. of Germany; Hans Gerber, Luterbach; Ivan Hidveghy, Zuchwil, both of Switzerland

[73] Assignee: Robert Bosch GmbH, Stuttgart, Fed. Rep. of Germany

[21] Appl. No.: 908,985

[22] Filed: May 24, 1978

[30] Foreign Application Priority Data

Jun. 2, 1977 [DE] Fed. Rep. of Germany ....... 2724815

[51] Int. Cl.² ............................................. H02P 5/40
[52] U.S. Cl. ..................................... 318/245; 318/332
[58] Field of Search ............... 318/244, 245, 246, 248, 318/249, 332

[56] References Cited

U.S. PATENT DOCUMENTS

| | | | |
|---|---|---|---|
| 3,588,647 | 6/1971 | Harwell | 318/245 |
| 3,818,298 | 6/1974 | Eriksson | 318/332 |
| 3,875,485 | 4/1975 | Hornung | 318/246 |
| 4,002,959 | 1/1977 | Schadlich et al. | 318/245 |
| 4,039,913 | 8/1977 | Clegg | 318/245 X |
| 4,110,671 | 8/1978 | Roger | 318/245 X |

Primary Examiner—J. V. Truhe
Assistant Examiner—W. E. Duncanson, Jr.
Attorney, Agent, or Firm—Frishauf, Holtz, Goodman & Woodward

[57] ABSTRACT

A universal motor is energized by a speed setting circuit during one half wave and a speed control circuit during the next half wave of each cycle of an AC supply. The speed setting and speed control circuits each have a separate timing circuit including a capacitor. There is thus no residual charge on the capacitor of the speed setting circuit remaining from the operation of the speed control circuit during the preceding half wave. The residual charge prevented the setting of low motor speeds in the known systems. The speed control circuit includes a storage capacitor transformer coupled to the motor so that its initial charge corresponds to the current through the motor during the preceding half wave. The charge is transferred to a second capacitor. When the voltage across the second capacitor reaches a predetermined threshold valve, a switch in the speed control circuit becomes conductive and current flows through the motor.

16 Claims, 2 Drawing Figures

SPEED SETTING AND CONTROL SYSTEM FOR UNIVERSAL MOTORS

The present invention relates to speed setting and speed control circuits for universal motors. More particularly, it relates to speed control and speed setting circuits wherein controllable switch means have a main conductive circuit connected in a series with a motor and an AC supply and wherein the speed setting circuit is operative in alternate half waves of the supply, while the speed control circuit is operative in the remaining half waves.

BACKGROUND AND PRIOR ART

Speed control and speed setting circuits for universal motors are known in which adjustable timing means are connected to the control electrode of the controllable switch means of the speed setting circuit. The adjustable timing means operate under external adjustment to set the speed of the motor at a selected speed at a predetermined load. The control is achieved by varying the phase angle during the alternate half waves at which the controllable switch means become conductive. In the known circuit described in U.S. Pat. No. 3 553 556 the speed control circuit also comprises controllable switch means having a main conductive circuit connected between the AC voltage supply and the motor which, during the half wave during which it is operative, furnishes a second current to the motor which varies in dependence on the value of current in the previous half wave in such a manner that the speed of the motor tends to remain constant, independent of load. In the known system a single capacitor forms part of the timing circuit associated with both the speed control and the speed setting circuits. This has the disadvantage that residual charge retained across the capacitor at the end of the control half wave will affect the speed setting circuit such that the speed setting circuit can only be adjusted to a minimum speed which substantially exceeds zero. A continuous adjustment of motor speed from a predetermined top speed to zero motor speed is thus impossible with the known system.

THE INVENTION

It is an object of the present invention to furnish a speed setting and control system for universal motors with a speed adjustment range including a minimum speed substantially equal to zero. It is a further object of the present invention to furnish a system wherein the speed of the motor is also maintained constant with changes in load to a greater extent than in the known circuits. Finally, the system of the present invention is to include means for limiting the no-load speed of the motor.

Briefly, in accordance with the invention, the timing means associated with the speed setting means operate independently of the storage means and control signal furnishing means which time the initiation of current flow during the half waves of the AC supply assigned to the speed control function.

In a preferred embodiment, said storage means is coupled to said speed setting means and furnishes, at the start of each of said half waves, a stored signal having an amplitude proportional to the current through motor during the preceding half wave.

In a preferred embodiment, the storage means is coupled to the speed setting means by a current transformer, and the controllable switch means of the speed setting and the speed control circuits are separate thyristors, each having a gate constituting the control electrode.

DRAWING ILLUSTRATING A PREFERRED EMBODIMENT

Figure 1:
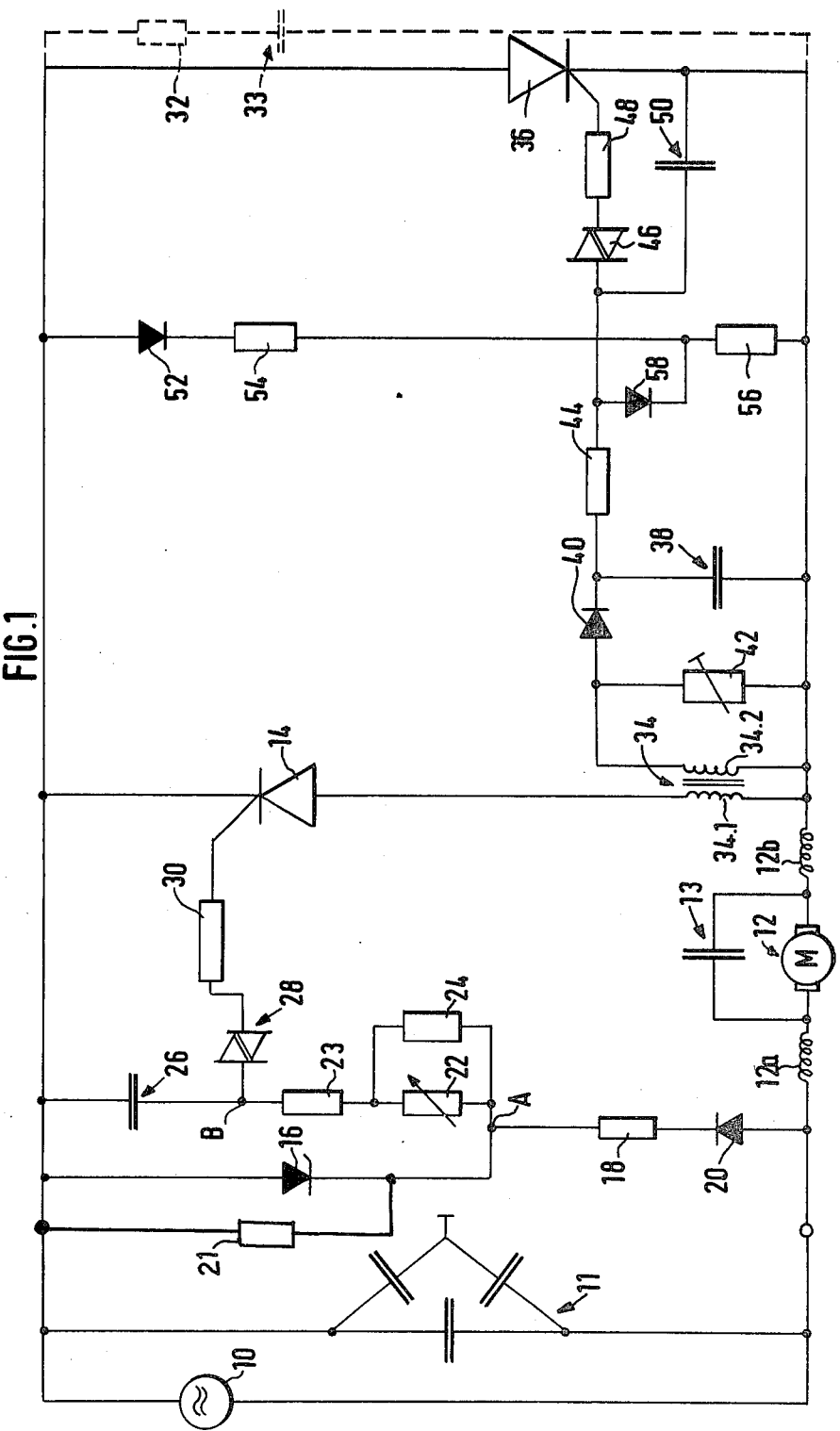
FIG. 1 is a schematic diagram of the system of the present invention.

In FIG. 1, reference numeral 10 indicates a source of AC voltage, which, in a preferred embodiment, is the the standard source of AC voltage furnishing a voltage of 110 volts at a frequency of 60 Hz. A motor 12 is energized by this source of AC voltage. In the embodiment of FIG. 1, this is a series-wound universal motor. Connected across the terminals of voltage supply 10 is the series circuit of motor 12 and the anode-cathode circuit of a first thyristor 14. The gate (control electrode) of thyristor 14 is connected through a resistor 30 to one terminal of a trigger diode 28 whose other terminal is connected to circuit point B which constitutes the output of adjustable timing means. The adjustable timing means comprises a capacitor 26 connected between one terminal of the source of AC voltage and circuit point B, the series circuit of a fixed resistor 23 and a variable resistor 22 connected between circuit point B and a further circuit point A, a resistor 24 connected in parallel with resistor 22, and the series combination of a resistor 18 and a diode 20 connected between circuit point A and the other terminal of the AC voltage source. A Zener diode 16 is connected between circuit point A and the first terminal of the AC voltage source 10. A resistor 21 is connected in parallel with Zener diode 16. The voltage half wave during which diode 20 is conductive will be referred to as the positive half wave herein. This positive half wave is the "alternate half wave" referred to in the claims. Zener diode 16 limits the voltage at point A to a predetermined value. Resistor 24 is a compensating resistor for compensating for tolerances in the various building elements. In particular, compensating resistor 24 allows exact setting of predetermined speeds including zero speed by adjustment of variable resistor (potentiometer) 22. Linearization of the idling speed can also be effected by means of adjustment of potentiometer 22. Trigger diode 28 is a threshold element. Zener diode 16 stabilizes the voltage at trigger diode 28 so that speed adjustment will be substantially independent of variations of supply voltage. An interference suppressor 11 is connected in parallel with AC voltage source 10. A further interference suppressor or spark eliminating capacitor 13 is connected in parallel with motor 12. To show exactly the connection between capacitor 13 and motor 12, field winding 12a and 12b of the motor are shown separately. A thyristor protection circuit including a resistor 32 and a capacitor 33, shown in dashed lines in FIG. 1, may be furnished in addition to or instead of capacitor 13.

For a given voltage across Zener diode 16, the time interval required after the start of the positive half wave for the voltage at point B to reach the threshold value required for diode 28 depends on the resistance values of resistors 23, 24 and 22. Thus adjustment of the value of variable resistor 22 determines the phase angle of the positive half wave at which thyristor 14 will become conductive. This phase angle in turn determines the speed of the motor.

The primary winding 34.1 of a current transformer 34 is connected in series with the anode-cathode circuit of thyristor 14. The secondary winding 34.2 of transformer 34 is part of the speed control circuit.

The speed control circuit includes a second controllable switch, namely a thyristor 36, which is connected in parallel with thyristor 14, but with opposite polarity. The anode-cathode circuit of thyristor 36 is thus also connected in series with motor 12. Thus, while thyristor 14 becomes conductive during part of the positive half wave, thyristor 36 will become conductive for part of the negative half wave, as determined by the circuit furnishing the control signal applied to the gate of thyristor 36.

A capacitor 38 in series with a diode 40 is connected in parallel with the secondary winding 34.2 of current transformer 34. A variable resistor 42 is also connected in parallel with secondary winding 34.2. The common point of capacitor 38 and diode 40 is connected through a resistor 44 to one terminal of a trigger diode 46 whose other terminal is connected through a resistor 48 with the gate of thyristor 36. A capacitor 50 is connected from the common point of diode 46 and resistor 44 to the cathode of thyristor 36. A voltage divider comprising a diode 52, a resistor 54 and a resistor 56 is connected in parallel with AC voltage source 10. The common point of resistor 54 and 56 is connected to the cathode of a diode 58 whose anode is connected to the common point of resistor 44 and diode 46.

Operation

During the positive half wave a current flows through thyristor 14 and motor 12, the amplitude of the current being, to a first approximation, a function only of the load of motor 12. This current also flows through the primary winding 34.1 of transformer 34 and induces a corresponding secondary current in secondary winding 34.2 of the transformer. This current charges capacitor 38, through diode 40, so that the charge on capacitor 38 and therefore the voltage across this capacitor, is a function of the peak value of the motor current during the preceding half wave, that is, is a function of motor load.

A small charge is also created across capacitor 50. The maximum voltage that can be created across capacitor 50 during the positive half wave depends upon the voltage division between resistor 44, diode 58 and resistor 56. Specifically, the maximum voltage across capacitor 50 is kept sufficiently small so that under no conditions will the trigger voltage required for diode 46 be exceeded.

At the beginning of the negative half wave, a current starts to flow over the series circuit including diode 52, resistor 54 and resistor 56. Diode 58 blocks. This causes the charged stored on capacitor 38 to be transferred to capacitor 50. The voltage across capacitor 50 continues to increase over the level present at the beginning of the negative half wave until such time as the required trigger voltage for diode 46 is exceeded. When diode 46 triggers, an ignition signal is applied to the gate of thyristor 36 and thyristor 36 becomes conductive, allowing the negative half wave current (herein referred to as second current) to flow through motor 12.

It is obvious that the time required for the voltage across capacitor 50 to reach a value triggering diode 46 in each negative half wave is a function of the voltage across capacitors 38 and 50 at the end of the positive half wave, that is it is a function of motor load. The control circuit thus operates in such a manner that the speed to which the motor was originally set by adjustment of resistor 22 will be maintained under varying load. It was possible in a practical circuit to change the phase angle at which thyristor 36 became conductive continously from approximately zero degress to approximately 180 degrees. For high loads, motor 12 was then driven in a practically full wave operating mode.

Figure 2:
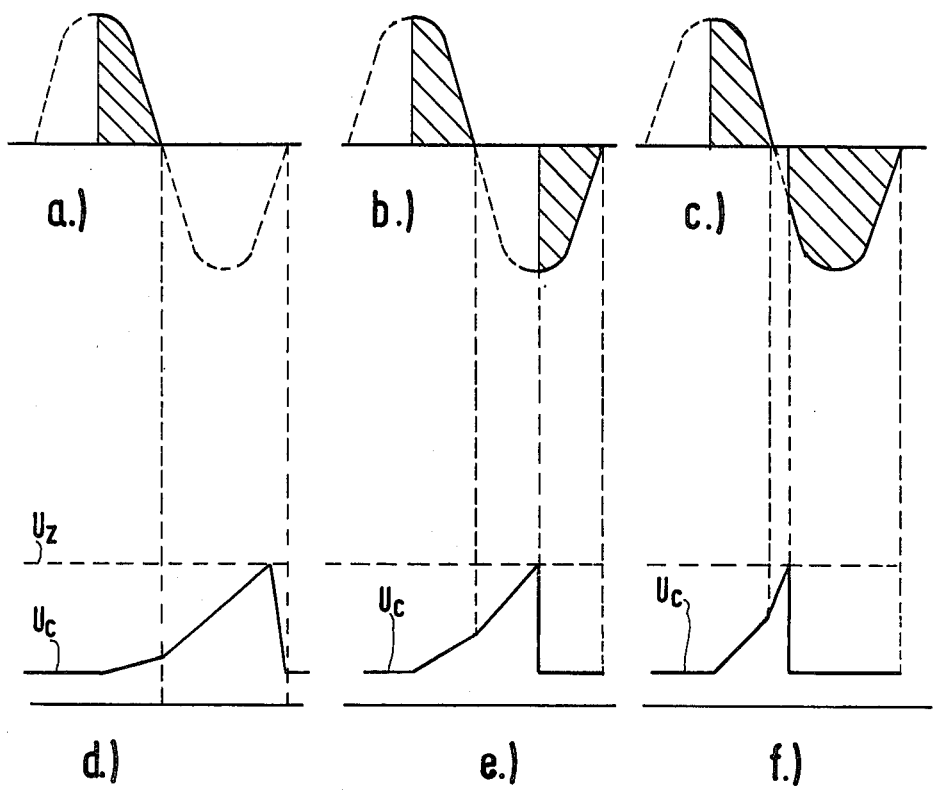
FIGS. 2a-2f are schematic diagrams illustrating the variation of signal with respect to time at different points in the circuit of FIG. 1 under different operation conditions.

The operation of the control circuit of FIG. 1 will become especially clear with reference to FIG. 2. FIGS. 2a, 2b and 2c show the voltages across motor 12 during different operating conditions, while FIGS. 2d–2f show the voltage across capacitor 50 for the operating condition of FIGS. 2a, 2b and 2c respectively.

In particular, FIGS. 2a and 2d show corresponding voltages for a no-load condition, FIGS. 2d and 2e show a normal operating condition in which the speed is maintained to a set value, and FIGS. 2c and 2f show the voltages across the motor and the capacitor when the motor operates with a load which is greater than or equal to the nominal load. The voltage created across capacitor 50 during the positive half wave, that is the voltage present across capacitor 50 at the start of the negative half wave, is denoted by $U_c$ in FIGS. 2d, 2e and 2f. This value is the lowest at no-load and increases with increasing load. The rate of change of voltage across capacitor 50 during the negative half wave depends on the motor load and is greater the bigger the load on the motor. The voltage $U_z$ is the voltage required for triggering diode 46. Under no-load conditions, as shown in FIG. 2d, the voltage $U_c$ at the end of the positive half wave is low, the rate of rise during the negative half wave is relatively slow because of the relatively small voltage across capacitor 38 and therefore the voltage $U_z$ is reached only at the end of the negative half wave or not at all. As shown in FIG. 2d, thyristor 36 will conduct for a very short time towards the end of the negative half wave only. As shown in FIG. 2e, under an increasing load, the level $U_c$ reached at the end of the positive half wave is greater and the rate of change of voltage across capacitor 50 during the negative half wave is higher because of the higher voltage across capacitor 38. The voltage across capacitor 50 reaches the level $U_z$ at about 90 degrees following the start of the negative half wave. Current flows throught motor 12 for the last 90 degrees of the negative half wave and capacitors 50 and 38 are discharged through the gate-cathode circuit of thyristor 36. For the third operating condition, namely an overload condition, the level $U_c$ reached during the positive half wave is even higher and the charging rate after the start of the negative half wave is also higher. Thyristor 36 becomes conductive shortly after the start of the negative half wave. Motor 12 draws current throughout almost all of the negative half wave.

In the embodiment in FIG. 1, two separate thyristors are utilized which are connected with opposite polarity across the AC voltage source. In a further embodiment, the two thyristors can be replaced by a single triac. Trigger diode 46, which is shown as a diac in FIG. 1 can also be replaced by a unijunction transistor.

No load speed is linearlized by the parallel circuit of resistors 22, 24. The function of the speed, that is, of the phase angle adjustment by changing the setting of potentiometer 22 is, in a first approximation, a cosine function. By the parallel connection of the resistor 24, the potentiometer voltage will become non-linear, which then leads to linearization of the phase angle that is, respectively, of no load speed, with respect to potentiometer movement.

The capacitor 13 across the armature 12 of motor M is not strictly necessary and may be omitted. The use of the R/C network 32, 33 is desirable.

The phase angle of current flow—see FIG. 2, graphs (a) to (c) will remain essentially constant upon change in loading; the current amplitude, however, will increase if the loading increases. Consequently, the peak voltage $U_c$, which is proportional to the peak current and stored in capacitor 30 will likewise increase.

It can also be of advantage to connect motor 12 directly between the anode of Zener diode 16 and the capacitor combination 11. The operation of the control circuit of the present invention would be substantially the same, but advantages would result relative to the wiring between the motor and the control circuit.

In principle it is also possible to replace the current transformer in the motor circuit with a series resistor from which a voltage proportional to the current through the motor could be derived. This embodiment has the advantage that a resistor is cheaper than a transformer and also less sensitive to shock which may be present when the control circuit of the present invention is used in a percussion drilling machine. However, the use of a resistor would result in additional heat losses so that a good head sink would have to be provided.

A further advantage of the present invention is that the no-load speed of a universal motor can be regulated in a very simple fashion. Such no-load limiting is particularly advantageous for high power machines which might reach such high speeds that damage can result to the machine and particularly to its bearings. To limit the no-load speed, resistor 42 is adjusted such that the phase angle at which thyristor 36 cuts in is limited to a predetermined minimum value, that is a predetermined value somewhere between zero and 30 degrees. This causes the motor supply voltage at no-load to be limited to a value $$\sqrt{\frac{1}{2}} \cdot U_{eff},$$

where $U_{eff}$ is the root means square value of the AC voltage furnished by AC voltage supply 10. Because of this limiting of the supply voltage, the speed at no-load is limited to a value which is approximately 80% of the no-load speed which would result if the full root mean square voltage of the supply were applied to the motor. Compensation resistor 24 is also used to linearize the no-load speed.

Various changes and modifications may be made within the scope of the inventive concept.

We claim:
1. In a speed setting and control system for an AC motor, said system having a source of AC voltage (10), speed setting means (14–30) connected to said source of AC voltage and said motor, for furnishing a first current to said motor during alternate half waves of said AC voltage, and speed control means (36, 44–58) connected to said source of AC voltage and said motor, for furnishing a second current to said motor during the remaining ones of said half waves of said AC voltage, the improvement comprising, in accordance with the invention, storage means (38) connected to said speed control means and said speed setting means, for furnishing a stored signal to said speed control means at the start of each of said remaining ones of said half waves, said stored signal varying as a function of the first current during the preceding one of said alternate half waves;

and wherein said speed setting means comprises adjustable timing means (22,23,26) separate from, and operative independently of, said storage means, for changing a characteristic value of said first current under external control until said motor operates at a selected speed, whereby the minimum speed settable by said adjustable timing means is independent of residual charge on said storage means.

2. A system as set forth in claim 1, wherein said speed setting means further comprises first controllable switch means (14) having a first main conductive circuit connected to said motor and said source of AC voltage, and a control electrode, for switching from a nonconductive state blocking said first current from said motor, to a conductive state supplying said first current to said motor when the amplitude of a first control signal applied at said control electrode exceeds a first predetermined threshold amplitude;

and wherein said externally adjustable timing means comprises means for setting the time within each of said alternate cycles at which said first control signal exceeds said first threshold amplitude.

3. A system as set forth in claim 2, wherein said speed control means further comprises second controllable switch means (36) having a second main conductive circuit connected to said motor and said source of AC voltage and a control electrode, for switching from a nonconductive state blocking said second current from said motor to a conductive state furnishing said second current to said motor when a second control signal applied at said control electrode exceeds a predetermined second threshold amplitude, and control signal furnishing means (44–58) connected to said storage means and said control electrode, for furnishing a second control signal having an amplitude exceeding said predetermined second threshold amplitude at a cut-in time in each of said remaining ones of said half waves, said cut-in time varying as a function of said amplitude of said stored signal in such a manner that the speed of said motor remains substantially constant, independent of load.

4. A system as set forth in claim 3, wherein said adjustable timing means comprises an RC circuit (22, 23, 26) having a variable resistor.

5. A system as set forth in claim 4, wherein said storage means comprises a storage capacitor.

6. A system as set forth in claim 5, wherein said storage means further comprises a current transformer (34) having a primary winding connected in series with said motor and a secondary winding, and means connecting said storage capacitor in parallel with said secondary winding.

7. A system as set forth in claim 6, wherein said means connecting said storage capacitor in parallel with said secondary winding comprises a diode (40).

8. A system as set forth in claim 4, wherein said RC circuit of said adjustable timing means constitutes a first RC circuit;

and wherein said control signal furnishing means comprises a second RC circuit (44,50) connected in parallel with said storage means.

9. A system as set forth in claim 8, wherein said storage means comprises a storage capacitor (38);

wherein said second RC circuit comprises a first resistor (44) and a first capacitor (50);

and wherein said control signal furnishing means further comprises limiter means (52-58) for limiting the voltage across said first capacitor to a voltage having an amplitude substantially less than said predetermined second threshold amplitude during said alternate half waves of said AC voltage and for permitting an increase of said voltage across said first capacitor to a voltage having an amplitude exceeding said predetermined second threshold amplitude during said remaining half waves of said AC voltage.

10. A system as set forth in claim 9, wherein said limiter means comprises a limiter resistor (56) and means (58) for connecting said limiter resistor in parallel with said first capacitor during said alternate half waves of said AC voltage.

11. A system as set forth in claim 10, wherein said means for connecting said limiter resistor in parallel with said first capacitor comprises a diode (58), and means for blocking said diode during said remaining half waves of said AC voltage.

12. A system as set forth in claim 6, further comprising idling speed limiter means (42) connected to said secondary winding of said current transformer, for limiting the idling speed of said motor.

13. A system as set forth in claim 12, wherein said idling speed limiter means comprises a variable resistor.

14. A system as set forth in claim 3, wherein said first and second controllable switch means comprise, respectively, a first and second thyristor, having, respectively, a first and second gate constituting said control electrode of said first and second controllable switch means, respectively.

15. A system as set forth in claim 1, wherein said first and second controllable switch means together constitute a triac, said triac having a gate constituting said control electrode.

16. A system as set forth in claim 1, wherein said speed setting means further comprises voltage stabilizing means (16) connected in parallel with said adjustable timing means for controlling the voltage there across.

* * * * *